(12) United States Patent
Kontermann et al.

(10) Patent No.: US 10,605,975 B2
(45) Date of Patent: Mar. 31, 2020

(54) LIGHT DISTRIBUTOR, A SYSTEM COMPRISING A LIGHT DISTRIBUTOR AND AT LEAST ONE LED LUMINAIRE AND A METHOD FOR PRODUCING A LIGHT DISTRIBUTOR

(71) Applicant: Fraunhofer-Gesellschaft zur Förderung der angewandten Forschung e.V., Munich (DE)

(72) Inventors: Stefan Kontermann, Hofheim (DE); Wolfgang Schade, Goslar (DE); Christian Winter, Goslar (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 57 days.

(21) Appl. No.: 15/480,090

(22) Filed: Apr. 5, 2017

(65) Prior Publication Data

US 2017/0205559 A1 Jul. 20, 2017

Related U.S. Application Data

(63) Continuation of application No. PCT/EP2015/072780, filed on Oct. 2, 2015.

(30) Foreign Application Priority Data

Oct. 6, 2014 (DE) .......... 10 2014 220 141

(51) Int. Cl.
*F21V 8/00* (2006.01)
(52) U.S. Cl.
CPC ......... *G02B 6/0041* (2013.01); *G02B 6/0035* (2013.01); *G02B 6/0065* (2013.01)

(58) Field of Classification Search
CPC ... G02B 6/0041; G02B 6/0035; G02B 6/0065
See application file for complete search history.

(56) References Cited

U.S. PATENT DOCUMENTS 6,036,340 A * 3/2000 Fohl .................. B60Q 1/0011
362/511
6,901,198 B2 * 5/2005 Shimizu ................ B29C 39/02
385/129

(Continued)

FOREIGN PATENT DOCUMENTS

| EP | 2 211 215 A1 | 7/2010 |
| JP | S60257521 A | 12/1985 |
| WO | WO 2013/039452 A1 | 3/2013 |

OTHER PUBLICATIONS

Daniel Day and Min Gu, "Microchannel fabrication in PMMA based on localized heating by nano-joule high repetition rate femtosecond pulses", Optics Express vol. 13 No. 16, pp. 5939-5946, Aug. 8, 2005. (Year: 2005).*

(Continued)

*Primary Examiner* — Arman B Fallahkhair
(74) *Attorney, Agent, or Firm* — Brinks Gilson & Lione

(57) ABSTRACT

A light distributor, a system consisting of a light distributor and an LED luminaire, and a method for producing a light distributor are provided. The light distributor may include a transparent main body having a light entrance area and a light exit area, at least one light-scattering structure with a changed refractive index inside the main body for scattering light, and at least one light-guiding structure with a changed refractive index inside the main body for guiding light. The light-scattering structure and the light-guiding structure may be produced by means of ultrashort pulse laser processing. The light-scattering structure and the light-guiding structure with a changed refractive index may be arranged in the main body.

20 Claims, 2 Drawing Sheets

(56) References Cited

U.S. PATENT DOCUMENTS

| | | | | |
|---|---|---|---|---|
| 7,327,908 | B1* | 2/2008 | Iazikov | G01D 5/38 385/12 |
| 7,343,060 | B2* | 3/2008 | Ohtsu | G02B 6/02042 385/129 |
| 7,742,674 | B2* | 6/2010 | Mossberg | G02B 5/203 385/129 |
| 8,115,792 | B2* | 2/2012 | Petsch | B41M 5/267 347/224 |
| 8,150,220 | B2* | 4/2012 | Nagafuji | G02B 6/12004 345/175 |
| 8,162,524 | B2* | 4/2012 | Van Ostrand | G02B 6/0028 362/231 |
| 8,998,479 | B2 | 4/2015 | Brick et al. | |
| 9,869,810 | B2* | 1/2018 | Keranen | G02B 6/0065 |
| 10,180,525 | B2* | 1/2019 | Yamamoto | F21S 2/00 |
| 2004/0057689 | A1 | 3/2004 | Shimizu et al. | |
| 2005/0244123 | A1 | 11/2005 | Hirao et al. | |
| 2006/0001036 | A1 | 1/2006 | Jacob et al. | |
| 2007/0248307 | A1* | 10/2007 | Page | G02B 6/0035 385/123 |
| 2012/0140518 | A1* | 6/2012 | Solomon | G02B 6/0016 362/607 |
| 2017/0153007 | A1* | 6/2017 | Banin | G02F 1/133606 |

OTHER PUBLICATIONS

Koo, J.S., et al., "UV written waveguide devices using crosslinkable PMMA-based copolymers," dated Feb. 20, 2003, pp. 1-2, Electronic Letters, vol. 39, No. 4, XP6019898A.

Baum, A., et al., "NUV and NIR Femtosecond Laser Modification of PMMA," dated Apr. 24, 2007, pp. 1-5, The 8$^{th}$ International Syumposium on Laser Precision Microfabrication, Apr. 24-28, 2007, University of Vienna, Vienna, Austria.

International Search Report with English translation, dated Jan. 18, 2016, pp. 1-6, issued in International Patent Application No. PCT/EP2015/072780, European Patent Office, Rijswijk, The Netherlands.

Henning Klank et al., "CO2-laser micromachining and back-end processing for rapid production of PMMA-based microfluidic systems," Lab on a Chip, dated Sep. 2002, pp. 242-246, vol. 2, The Royal Society of Chemistry, Denmark.

Yan Li et al., "Single femtosecond pulse holography using polymethyl methacrylate," Optics Express, dated Oct. 2002, pp. 1173-1178, vol. 10, No. 21, Optical Society of America, Washington, DC.

J. Arnold et al., "Combination of excimer laser micromachining and replication processes suited for large scale production," Applied Surface Science 86, dated 1995, pp. 251-258, Institute for Microtechnology GmbH, Mainz, Germany.

Norbert Preuss, "Das Licht geht neue Wege" (with translation), Spezial: Optische Mikrostrukturen, dated 2006, pp. 28-30, vol. 3, Carl Hanser Verlag, Munich, Germany.

* cited by examiner

LIGHT DISTRIBUTOR, A SYSTEM COMPRISING A LIGHT DISTRIBUTOR AND AT LEAST ONE LED LUMINAIRE AND A METHOD FOR PRODUCING A LIGHT DISTRIBUTOR

CROSS-REFERENCE TO RELATED APPLICATIONS

This application is a continuation of PCT/EP2015/072780 filed Oct. 2, 2015, which claims priority to German Patent Application 10 2014 220 141.1 filed Oct. 6, 2014, both of which are hereby incorporated by reference.

BACKGROUND

The lighting industry has undergone a fundamental change by developing the white LED. Huge energy savings are possibly by means of the LED light and this industry makes a positive contribution to the energy transition.

In addition to the energy saving effects, the LED also makes possible completely new luminaire designs. In particular the possibility of feeding light by means of a so-called LED strip laterally into a transparent plate creates the precondition of designing very flat luminaires. Here, it is also desired to have the greatest possible, preferably complete, transparency of the luminaire in order to realize a "light, floating" design.

A problem of this type of luminaire is that the light which is fed from the LED via the edge into the plate and then guided in the plate has to be deflected by about 90° in order for it to exit the plate surface perpendicularly to illuminate the floor or ceiling of the room to be lighted. The solution according to the prior art ensures that a surface of the plate and/or the light exit surface of the plate is provided with a surface structuring. As a result, it is possible to produce reflections and light refraction in the area of the substrate-air interface.

According to a solution approach, e.g. pyramid-shaped or conical recesses are realized in the surface by mechanical methods. However, the drawback is that such structured plates are no longer sufficiently transparent.

DE 10 2004 026 585 B4 discloses a light distributor having a light-distributing structure consisting of microstructures and macrostructures. This is again a surface structuring which in the described case is produced by means of laser structuring. This is understood to mean a local and precise removal of material on the surface. This method is used for transparent melting plastic materials, such as PMMA (polymethyl methacrylate, commercial name: Plexiglas or Perspex, acrylic glass). In this method, the plastic material is heated, material evaporates and depolymerizes. Due to the sudden heat exposure, individual particles are explosively removed from the material in adjoining areas, at other locations the material just melts and solidifies again. Although this type of surface structuring can be controlled in relatively precise fashion, the problem of the no longer perfectly transparent surface continues to exist.

The irradiation of various substrates, in particular also of plastic materials and glasses, is presently scrutinized in basic research and without concrete reference to the light distributor and luminaire design topics. It is already known that the refractive index of a substrate can be changed locally in the case of the specific irradiation with laser pulses. For this purpose, short-term pulse lasers are used, in particular lasers within the femtosecond range. For a successful local change in the refractive index it is necessary to synchronize pulse parameters, on the one hand, and the treated material, on the other hand. An example of such a scientific investigation relating to refractive index changes in PMMA is e.g. the publication by Alexandra Baum et al.: "*NUV and NIR Femtosecond Laser Modification of PMMA*", Proceedings of LPM 2007—The $8^{th}$ International Symposium on Laser Precision Micro fabrication.

DE 10 2009 025 072 A1 discloses a method for producing a region with increased refractive index. The method comprises providing a substrate from polycarbonate and producing the region in the substrate by irradiation. This region with increased refractive index can form an optical waveguide. In addition to polycarbonate as a substrate, the use of PMMA is discussed as well. The latter has to be regarded as an equivalent material selection with respect to some aspects, however, this publication points out that compared to polycarbonate PMMA would have a much greater tendency to form blisters when irradiated by means of a laser, as a result of which the process control would be much more complicated in order to avoid such bubbles in the case of PMMA. The absorption behavior of PMMA would also be disadvantageous.

DE 10 2013 100 888 A1 finally discloses a light concentrator or light distributor which is composed of a plurality of light guiding cells which are lined up in a transparent light guide body. The light guide cells are formed by interfaces which can be produced inter alia by means of laser radiation in the light guide body. In this connection, there is also a local change in the refractive index. However, the light distributor known from this document is only suitable for a perpendicular coupling. The light guide body and/or the substrate material are in most cases an inorganic material and/or a glass, and there is only a general reference to plastic materials and the fundamental suitability thereof.

DETAILED DESCRIPTION

Figure 1:
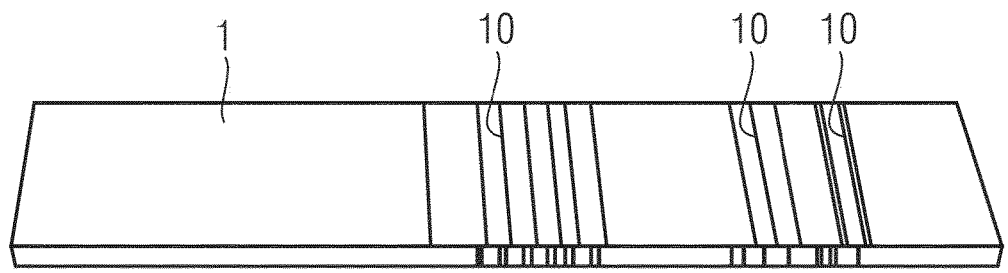
FIG. 1 shows an ultrashort pulse laser-processed Plexiglas having light-scattering structures of different transparency.

The present invention may provide an improved light distributor which allows, in particular, a lateral coupling of light in the light distributor. The light distributor may be break-proof and have a high transparency. In other examples, it may be easy to produce.

The invention relates to a light distributor, a system comprising a light distributor and at least one LED luminaire as well as a method for producing a light distributor. A light distributor is an optical component, by means of which light from small-part light producers, such as LEDs, OLEDs or lasers, can be offered in such a way that it is uniformly distributed over relatively large areas. In particular, the invention relates to a light distributor, a system comprising a light distributor and an LED luminaire as well as a method for producing a light distributor, where the light distributor has structures produced by means of laser processing.

A basic concept of the invention is to combine light-scattering and light-guiding structures with one another for the first time in a light distributor. This renders possible the requested light deflection by about 90° and/or renders possible the efficient lateral coupling of light. Furthermore, the light-scattering and light-guiding structures are produced by the use of ultrashort pulse lasers. The irradiation is accompanied by a local change in the refractive index, thus rendering possible the light scatter and light guide. In this connection, these structures are not formed on the surface but in the light distributor and/or its transparent main body. Both the kind of forming the structures and the positioning thereof (not on the surface) contribute to a considerably improved transparency of the light distributor and thus to a lighting effect which is much more esthetic.

According to a first aspect of the invention, this invention relates to a light distributor which has a transparent main body including a light entrance area and a light exit area. It has at least one light-scattering structure with a changed refractive index in the main body for scattering light and at least one light-guiding structure with a changed refractive index in the main body for guiding light. In this connection, the light-scattering structure and the light-guiding structure were produced by ultrashort pulse laser processing. Thus, they have an area with a changed refractive index compared to the non-irradiated main body. The light-scattering structure and the light-guiding structure with a changed refractive index are arranged in the main body in such a way that light incident through the light entrance area is initially scattered at the light-scattering structure and then—substantially owing to the preceding scatter—can be guided to the light exit area by means of the light-guiding structure with a changed refractive index.

The at least one light-scattering structure and the at least one light-guiding structure are here preferably—but not compulsorily—produced by means of the same ultrashort pulse laser. However, it is alternatively possible to also use different or a plurality of equal ultrashort pulse lasers.

The irradiation of the transparent main body by means of an ultrashort pulse laser differs from the laser processing methods formerly established by means of application technology, in particular also from the so-called conventional laser structuring. Laser structuring is understood to mean a surface processing method that is accompanied by the removal of material. This is not the case in ultrashort pulse laser processing because there is no such removal of material. When the process parameters are chosen appropriately there is also no melting or depolymerization of the material and/or the main body. The reason is that the employed ultrashort laser pulses are so short that there is no heat transfer into the material. As a result, no material is melted. The fact rather is that in the ultrashort pulse laser processing local material compactions or also a local reduction in the compaction can be obtained due to the laser field strength, which in turn leads to a spot having a locally varied refractive index. Therefore, the ultrashort pulse laser processing according to the present invention is based on a local change in the material density and thus the refractive index. Here, the light-scattering structure and the light-guiding structure in the transparent main body are composed of the same material as the main body. There is no addition of foreign materials, inserts, dopants or the like in order to change the refractive index. This contributes to a very good transparency of the main body and/or light distributor and thus to a very esthetic appearance.

The ultrashort pulse lasers used for producing the light-scattering structure and the light-guiding structure can operate at different frequencies or pulse durations. Depending on the material of the transparent main body, the light-scattering structure and/or the light-guiding structure can be produced by means of different laser types. In some embodiments of the invention, a titanium-sapphire laser and/or a fiber laser and/or an ytterbium-doped potassium-yttrium-tungsten laser (Yb:KYW) can be used, which can produce pulse durations of about 2 fs to about 100 fs or of about 10 fs to about 100 fs. In other embodiments of the invention, a neodymium-garnet laser (Nd-YAG laser) can be used and can produce pulse durations of about 1 ns to about 100 ns or of about 10 ns to about 50 ns. The wavelength of the laser radiation can be selected between about 700 nm and about 1100 nm or between about 700 nm and about 1000 nm or between about 750 nm and about 850 nm. The refractive index can be changed by the irradiation with laser pulses in the irradiated partial areas by a value $\Delta n$ which in some embodiments of the invention can be about $10^{-3}$ to about $10^{-4}$.

According to an embodiment of the invention, the transparent main body is made of a plastic material. According to a further embodiment, the main body contains PMMA. In some embodiments, the main body consists of PMMA. PMMA is the abbreviation for polymethyl methacrylate and is also known by the trade name of Plexiglas or Perspex and acrylic glass. However, the use of other plastic materials is also basically possible as long as the plastic material can be processed by means of a laser. A further example is e.g. PS (polystyrene) or plastic materials on the basis of polybutadienes. The use of polycarbonate is also possible. In other embodiments of the invention, it is possible to use polylactide, which is also abbreviated below as PLA. In some embodiments of the invention, a biocompatible polymer can be used. The term biocompatibility shall comprise for the purposes of the invention the functional similarity with respect to the body's own structures and/or an appropriate biological compatibility in a human or animal body. The advantage of many of the above-mentioned plastic materials is that they have the high breaking strength which is necessary for a use in a light distributor.

According to an embodiment of the invention, the main body is made as a cuboid-shaped plate. As a result, it is possible to obtain a very flat luminaire design. In some embodiments of the invention, the plate can have a size of about 50×100 mm² to about 300×1000 mm².

According to the invention, the light-scattering structure and the light-guiding structure with a changed refractive index are arranged in the main body in such a way that light incident through the light entrance area is initially scattered at the light-scattering structure and then guided by means of the light-guiding structure with a changed refractive index to the light exit area. Due to this arrangement it is possible to so to speak deflect light by a desired amount in the transparent main body. It is for example possible to choose the arrangement of the light entrance area, the light exit area, the light-scattering structure and the light-guiding structure in relation to one another in such a way that a light deflection by about 90° or more can be done by means of the light distributor. In this connection, the fact normally is that the light is perpendicularly incident on the light entrance area and substantially also perpendicularly exits the light exit area (here an unprocessed and/or non-microstructured surface) again. With this perpendicular light entrance and/or light exit through the light entrance area and the light exit area, the angle between the light entrance area and the light exit area is thus identical with the angle of the light deflection as such. In another light entrance or light exit, this does, of course, not have to be the case. An arrangement of light entrance area and light exit area at an angle of 90° with respect to one another makes it in particular possible to use the light distributor according to the invention in a very efficiently edge-fed way by an LED luminaire.

Furthermore, the light distributor according to the invention is designed specifically for demands including a light deflection. For reasons of light deflection inside the main body, the light-scattering structure and the light-guiding structure are combined with one another according to the invention. However, there is no such combination when e.g. a light entrance area and a light exit area of a light distributor are arranged in parallel to one another. In this case there is no necessity to provide a light-scattering structure for the light deflection. Therefore, in one embodiment of the light distributor according to the invention, the light entrance area and the light exit area are not parallel to one another. They are preferably arranged e.g. at right angles.

According to an embodiment of the invention, the light-scattering structure is made as at least one linearly arranged sequence of scattering centers within the main body. In principle, this scattering structure can therefore be conceived as kind of a dotted line due to the pulse property of the laser. The size of the scattering centers and the distance thereof can be adjusted by the ultrashort pulse laser process parameters. In some embodiments of the invention, the size of the scattering centers can be approximately 0.1 µm to about 100 µm. In other embodiments of the invention, the size of the scattering centers can be about 1 µm to about 10 µm.

When the light distributor is e.g. a cuboid-shaped plate, the addressed, linearly arranged sequence of scattering centers can run through e.g. the entire width of the plate. It is possible for a plurality of light-scattering structures to be provided in the form of linearly arranged sequences of scattering centers inside the scattering body. What matters here, can be a plurality of line structures which are substantially parallel to one another. However, it is, of course, also possible that the light-scattering structure does not have a linear form but a twisted form, etc.

According to an embodiment of the invention, the light-guiding structure with a changed refractive index has a dimension in the micrometer range or submicrometer range. The light-guiding structure per se can be formed differently here. For example, it is possible for it to consist of, or include, one or more parallel channels of substantially linear type. However, the structure can also have a plurality of curved channels or alternatively a funnel-shaped structure. A funnel-shaped structure tapers preferably in a direction away from the light-scattering structures. It collects so to speak funnel-like scattered light. In any case, the effect of light conduction is based on the created refractive index changes in the light-guiding structure. When the refractive index changes in the material of the main body are relatively large, it is possible to cause total reflections of the light in the main body and thus guide the light. However, it is also conceivable to only have one light guide and/or deflection. Here, the light guides have a diameter of about 0.1 µm to about 100 µm or of about 1 µm to about 10 µm or of about 0.1 µm to about 10 µm. The length can be a plurality of millimeters or several centimeters. In some embodiments, the length can be between 100 µm and about 10 cm.

According to an embodiment of the invention, an angle between the straight line which is defined by a linear sequence of scattering centers and a straight line which describes the main guiding direction of the light-guiding structure is between about 80° and about 100°, preferably approximately 90°. The main guiding direction of the light-guiding structure is here the direction into which the light shall be guided. In most cases, the main guiding direction of the light-guiding structure coincides with the main axis of the light-guiding structure. In this way, it is possible in a very efficient way to realize a corresponding light deflection by about 90°.

According to a further aspect of the invention, this invention relates to a system having a light distributor as described above and at least one LED luminaire, the light distributor and the LED luminaire being arranged in relation to one another in such a way that the light distributor is edge-fed by the light of the LED luminaire. In particular, what is concerned here is a light distributor made in the form of a flat cuboid-shaped plate, as typically used for lighting purposes. In this connection, a single LED luminaire can be provided but it is also possible to provide a plurality of LED luminaires, e.g. in the form of an LED strip. It is furthermore possible to provide various sides of the light distributor (preferably on both edges) with LED luminaires. This applies, in turn, also to the possibility of providing LED luminaire strips. Instead of an LED based on inorganic material, it is also possible to provide an organic light-emitting diode (OLED). The use of other small-part light producers is also possible.

The light distributor according to the invention can form a luminaire or part of a luminaire, by means of which it is possible to light an interior or an exterior surface. In further embodiments of the invention, the light distributor can be part of an advertising panel and/or form a background lighting of an advertising panel. In yet another embodiment, the light distributor can form a background lighting of an LCD display. Even though the light distributor is preferably used with LED light sources, this does not exclude the use of other light sources.

According to a further aspect of the invention, this invention relates to a method for producing a light distributor, in particular to a method for producing a light distributor, as described above. The method according to the invention here includes the following steps:

Providing a transparent main body;

Irradiating the main body with ultrashort laser pulses of an ultrashort pulse laser, thereby forming a light-scattering structure with a changed refractive index in the main body and forming a light-guiding structure with a changed refractive index in the main body, the light-scattering structure and the light-guiding structure being arranged in such a way that coupled-in light can initially be scattered at the light-scattering structure and then be guided through the light-guiding structure and/or be coupled out.

As regards the irradiation process, the statements made already in connection with the light distributor apply. It is in particular possible to use as ultrashort pulse lasers femtosecond lasers which operate in the near UV or also in the near infrared range.

The transparent main body is here preferably made of a plastic material, in particular the main body is made on the basis of PMMA. Furthermore, the statements made on the main body in connection with the light distributor apply here as well.

According to an embodiment of the invention, at least one of the following operating parameters of the ultrashort pulse laser is varied while the structures are produced by irradiation. The at least one operating parameter can be selected from: pulse power, pulse number, pulse duration, laser frequency and/or pulse form. Alternatively or additionally it is also possible to vary other process parameters. This includes in particular process parameters which refer to a relative movement between the main body to be processed and the ultrashort pulse laser device. For example, parameters of a scanning method or a feed can be changed, which in turn exert an influence on the location and duration of the irradiation of the main body. As a result of varying one or more above mentioned operating parameters, it is e.g. possible to flexibly adapt the location and/or position of the light-scattering structures and light-guiding structures to the demanded conditions. Alternatively or additionally it is possible to influence the degree of transparency of the structures in the transparent main body by the selection of the process parameters.

The above mentioned embodiments of the invention can be combined with one another in whole or in part.

The invention is understood even better with reference to the enclosed drawings, wherein FIG. 1 is an ultrashort pulse laser-processed Plexiglas having light-scattering structures of different transparency.

Figure 2:
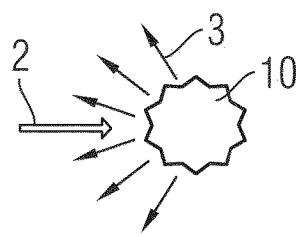
FIG. 2 shows a scattering effect of a light-scattering structure.

FIG. 2 illustrates the scattering effect of a light-scattering structure.

Figure 3:
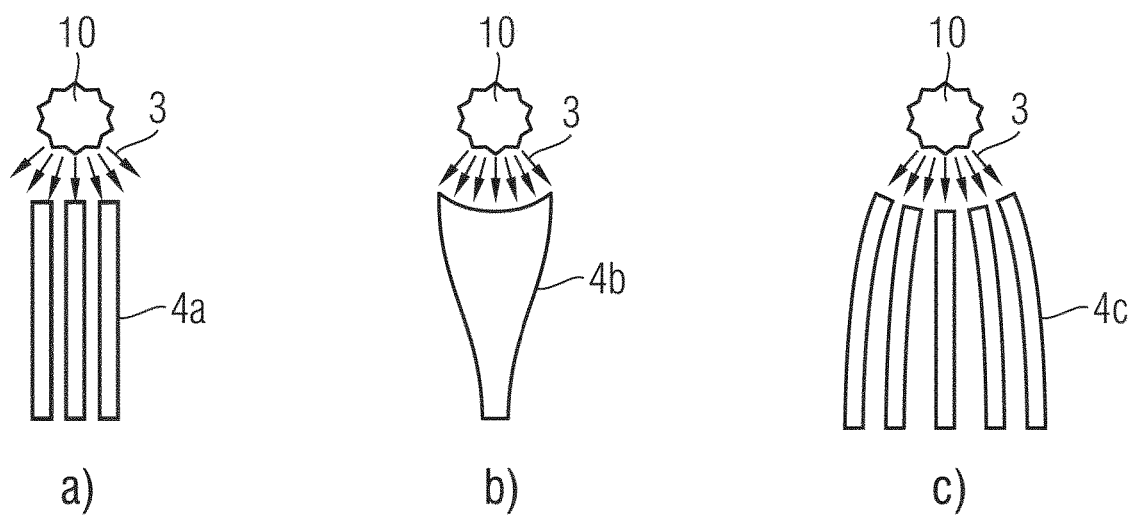
FIG. 3 shows various arrangements of light-guiding structures in relation to a light-scattering structure.

FIG. 3 shows various arrangements of light-guiding structures in relation to a light-scattering structure.

Figure 4:
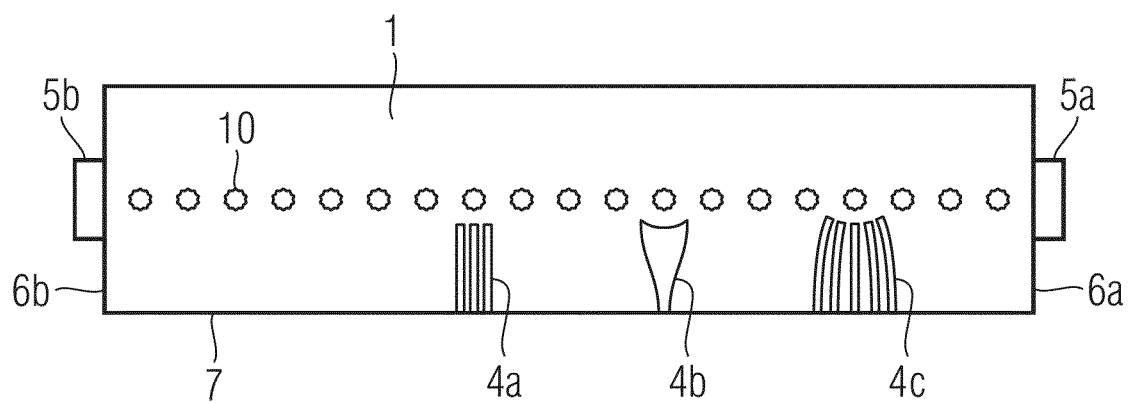
FIG. 4 shows a cross-section through a Plexiglas plate having light-scattering and light-guiding structures, the Plexiglas plate being fed laterally along the edge by means of LED light.

FIG. 4 shows a cross-section through a Plexiglas plate having light-scattering and light-guiding structures, the Plexiglas plate being fed laterally along the edge by means of LED light.

FIG. 1 shows ultrashort pulse laser-processed Plexiglas having light-scattering structures of different transparency. A transparent main body 1 made from Plexiglas is shown. It is made in the form of a cuboid-shaped plate. A plurality of linearly arranged light-scattering structures 10 of different transparency are shown in the plate. In the illustrated example, they extend along the entire width of the main body 1 and are also arranged in parallel to one another. The light-scattering structures 10 are therefore a linearly arranged sequence of scattering centers in the main body 1. The light-scattering structures 10 are here not compulsorily formed on the surface of the main body 1 but can extend e.g. in the center of the main body 1 as regards the thickness of the main body.

FIG. 2 illustrates by way of diagram the scattering effect of a light-scattering structure 10. Incident light 2 strikes this light-scattering structure 10 and is illustrated in FIG. 2 by a thick arrow. The incident light 2 is scattered at the light-scattering structure 10 due to the refractive index which is changed there. The scattered light 3 is outlined by the thin arrows.

FIG. 3 illustrates by way of example a plurality of arrangements of light-guiding structures 4a to 4c in relation to a light-scattering structure 10. Bright and dark regions of the light-guiding structures 4a to 4c illustrate regions with a different refractive index. The light 3 scattered by the light-scattering structure 10 is here incident on the respective light-guiding structure 4a, 4b, 4c and/or in the light-guiding structure 4a, 4b, 4c and is guided therein in particular by total reflection. In FIG. 3a, the light-guiding structure is made in the form of a plurality of channels which are arranged in parallel to one another and in which the light 3 is guided. In FIG. 3b, the light-guiding structure 4b is made as a funnel where the light 3 can be moved in guided fashion. In FIG. 3c, the light-guiding structure 4c is made in the form of a plurality of slightly curved channels which extend side by side. The slight curvature thus makes possible a gradual deflection of the guiding direction in the final guiding direction. In all illustrated cases 3a to 3c, the main guiding direction of the light-guiding structure is perpendicular, which means that it is in the paper plane and light 3 is guided there from top to bottom.

FIG. 4 shows by way of diagram and in cross-section a system having a light distributor and two LED luminaires. What is shown is the typical case of an edge feed. The Plexiglas cuboid is shown in cross-section and has a transparent main body 1. Each side is provided with an LED luminaire 5a and/or 5b. The LED luminaires are thus located correspondingly at the light entrance areas 6a and 6b. A plurality of light-scattering structures 10 is disposed on the imaginary connecting line between the LED luminaires 5a and 5b. Each of these light-scattering structures 10 is a substantially linearly arranged sequence of scattering centers. The light-scattering structures 10 are here provided substantially in parallel to one another. They are not arranged on the surface but in the center of the transparent main body 1 of the light distributor. In the lower region of the main body 1, a plurality of different light-guiding structures 4a, 4b and 4c is shown. The angle between the straight line which is defined by the linear sequence of the scattering centers of each light-scattering structure 10 and the main guiding direction of the light-guiding structures 4a, 4b and 4c is precisely 90° in the illustrated example. The angle between the connecting line between the LED luminaires 5a and 5b and the main guiding direction of the light-guiding structures 4a, 4b and 4c is always 90°.

Light from the LED luminaires 5a and 5b that enters through the light entrance areas 6a and 6b is scattered at one of the light-scattering structures 10. After this scatter, the scattered light reaches one of the light-guiding structures 4a, 4b and 4c and then exits the main body 1 of the light distributor through the light exit area 7. The illustrated system of light distributor and LED luminaires 5a, 5b guarantees a very good transparency and a very advantageous lighting result. The time-tested PMMA material can here be used without any problems. In the illustrated embodiment, a wavelength of about 800 nm was used for the laser processing. The repetition rate of the laser pulses was approximately 5 kHz and the average power was 20 mW. The structure 10 was produced at a feed rate of 0.5 mm/s.

It is disclosed to a person skilled in the field of the invention that the invention is not limited to the details of the embodiments that are listed above by way of example but that the present invention can be embodied in other special forms without departing from the scope of the invention which is determined by the enclosed claims.

The invention claimed is:

1. Light distributor, comprising a transparent main body made of a plastic, the transparent main body including:
   a light entrance area;
   a light exit area;
   at least one light-scattering structure coupled to said light entrance area and having a first changed refractive index, the at least one light-scattering structure arranged in the transparent main body and adapted to scatter light; and
   at least one light-guiding structure having a first end and a second end, said first end coupled to said light-scattering structure and said second end is coupled to said light exit area, the light-guiding structure having a second changed refractive index, wherein the light-guiding structure is arranged in the transparent main body and adapted to guide light; and
   wherein the light-scattering structure and the light-guiding structure are composed of the same material as the transparent main body which has been modified by controlling the intensity of radiation by ultrashort laser pulses such that the first changed refractive index is less than a refractive index of the plastic unmodified by the ultrashort laser pulses and the second changed refractive index is higher than the refractive index of the plastic unmodified by the ultrashort laser pulses.

2. The light distributor according to claim 1, wherein the light-scattering structure is made as at least one linearly arranged sequence of scattering centers in the transparent main body.

3. The light distributor according to claim 2, wherein an angle between a straight line defined by the linear sequence of the scattering centers and a straight line which describes the main guiding direction of the light-guiding structure is between about 80° and about 100°.

4. The light distributor according to claim 3, wherein the angle between the straight line defined by the linear sequence of the scattering centers and the straight line which describes the main guiding direction of the light-guiding structure is approximately 90°.

5. The light distributor according to claim 1, wherein the transparent main body comprises PMM or PLA or a biocompatible polymer.

6. The light distributor according to claim 1, wherein the light-guiding structure with the second changed refractive index has a length between 100 μm and about 10 cm.

7. The light distributor according to claim 1, wherein the transparent main body is made as a cuboid-shaped plate.

8. The light distributor according to claim 1, wherein the light entrance area, the light exit area, the light-scattering structure and the light-guiding structure are arranged relative to one another in such a way that there can be a light deflection by 90° or more with the light distributor.

9. The light distributor according to claim 1, wherein the light-guiding structure has a diameter of about 0.1 μm to about 10 μm.

10. A system comprising:
a light distributor; and
at least one LED luminaire,
wherein the light distributor and the LED luminaire are arranged in such a way that the light distributor is edge-fed by the light of the LED luminaire, and
wherein the light distributor comprises:
a transparent main body made of a plastic, the transparent main body comprising
a light entrance area,
a light exit area,
at least one light-scattering structure coupled to said light entrance area, and
at least one light-guiding structure, wherein the at least one light-guiding structure has a first end and a second end, said first end is coupled to said light-scattering structure and said second end is coupled to said light exit area, wherein the light-guiding structure has a first changed refractive index, is arranged in the transparent main body, is adapted to guide light, and wherein the at least one light-scattering structure has a second changed refractive index, is arranged in the transparent main body, and is adapted to scatter light, and
wherein the light-scattering structure and the light-guiding structure are composed of the same material as the transparent main body which has been modified by ultrashort pulse laser processing in which the intensity of radiation by ultrashort laser pulses is controlled such that the second changed refractive index is less than a refractive index of the plastic unmodified by the ultrashort laser pulses and the first changed refractive index is higher than the refractive index of the plastic unmodified by the ultrashort laser pulses.

11. The system according to claim 10, wherein the light-scattering structure is made as at least one linearly arranged sequence of scattering centers in the transparent main body.

12. The system according to claim 11, wherein an angle between a straight line defined by the linear sequence of the scattering centers and a straight line which describes the main guiding direction of the light-guiding structure is between about 80° and about 100°.

13. The system according to claim 12, wherein the angle between the straight line defined by the linear sequence of the scattering centers and the straight line which describes the main guiding direction of the light-guiding structure is approximately 90°.

14. The system according to claim 10, wherein the transparent main body comprises PMM or PLA or a biocompatible polymer.

15. The system according to claim 10, wherein the light-guiding structure with the second changed refractive index has a length between 100 μm and about 10 cm.

16. The system according to claim 10, wherein the transparent main body is made as a cuboid-shaped plate.

17. The system according to claim 10, wherein an arrangement of the light entrance area, the light exit area, the light-scattering structure and the light-guiding structure are selected in relation to one another in such a way that there can be a light deflection by 90° or more with the light distributor.

18. A method for producing a light distributor, the method comprising:
providing a transparent main body made of a plastic; and
irradiating the transparent main body with ultrashort laser pulses of an ultrashort pulse laser thereby
forming a light-scattering structure with a first changed refractive index in the transparent main body, and a light-guiding structure with a second changed refractive index in the transparent main body by controlling the intensity of radiation by ultrashort laser pulses such that the first changed refractive index is less than a refractive index of the plastic unmodified by the ultrashort laser pulses and the second changed refractive index is higher than the refractive index of the plastic unmodified by the ultrashort laser pulses,
wherein the light-scattering structure and the light-guiding structure are arranged in such a way that coupled-in light is initially scattered at the light-scattering structure and then guided through the light-guiding structure and coupled out, wherein the light-scattering structure and the light-guiding structure are composed of the same material as the transparent main body.

19. The method according to claim 18, wherein the transparent main body comprises PMMA or PLA or a biocompatible polymer.

20. The method of claim 18, wherein at least one of the following operating parameters of the ultrashort pulse laser is varied during production of the light-guiding structure and the light-scattering structure by irradiation: pulse power, pulse number, pulse duration, and/or laser frequency.

* * * * *